United States Patent [19]

Cooper et al.

[11] Patent Number: 5,367,256
[45] Date of Patent: Nov. 22, 1994

[54] MULTI-TURN POSITION SENSOR HAVING VARIABLE COUPLING TRANSFORMER

[75] Inventors: Stephen R. W. Cooper, Tustin; Mark R. Wheeler, Caditlor, both of Mich.

[73] Assignee: Nartron Corporation, Reed City, Mich.

[21] Appl. No.: 974,453

[22] Filed: Nov. 12, 1992

[51] Int. Cl.⁵ .......................... G01B 7/14; H01F 21/02
[52] U.S. Cl. .......................... 324/207.17; 324/207.13; 324/207.22; 324/207.25; 336/20
[58] Field of Search .................. 324/207.13, 207.25, 324/207.15, 207.16, 207.17, 207.22; 336/20

[56] References Cited

U.S. PATENT DOCUMENTS 4,631,478 12/1986 Knetsch et al. ................ 324/207.13

Primary Examiner—Walter E. Snow
Attorney, Agent, or Firm—Watts, Hoffmann, Fisher & Heinke Co.

[57] ABSTRACT

A multi-turn rotational position sensor. A spirally wound conductor has an inner end coupled to a rotatable shall through a transmission. As the shaft rotates, the spirally wound conductor changes shape. The spirally wound conductor is inductively coupled to a transfcrmer secondary and the transformer coupling between the spirally wound conductor changes as the shaft rotates. An output from the transformer secondary is used to determine the shaft's rotational position.

10 Claims, 3 Drawing Sheets

5,367,256

MULTI-TURN POSITION SENSOR HAVING VARIABLE COUPLING TRANSFORMER

TECHNICAL FIELD

This invention relates to an orientation sensor and more particularly to a transformer used as a position sensor for sensing the rotational position of a shaft.

BACKGROUND OF THE INVENTION

Sensors for sensing the rotational position of axles, shafts, or columns such 10 as steering columns are known in the prior art. Rotation position means the orientation of the shaft plus the number of turns the shaft has rotated from a beginning or reference position. Such sensors generally operate in one of three ways. One manner of operation is to combine an orientation sensor with a mechanical or electrical counter to keep track of the specific turn that the sensor is sensing among a multiplicity of turns. The orientation sensor then provides the relative position within any given turn. The advantage of this type of sensor is that a great multiplicity (within the counter's range) can be accommodated. However, a disadvantage arises from the cost and reliability of the "counter" and signal discontinuities at the turn boundaries where the counter must increment the signal output and the orientation sensor must simultaneously return to its zero degree output. Mechanical counters are subject to wear and exhibit "dither" and/or "backlash" error at the increment point. Electronic counters lose their count upon loss of power unless expensive, non-volatile memory is incorporated in their design.

A second type of sensor is a "single-turn" orientation sensor combined with a reduction gear system to translate multiple turns into a single turn. The gear linkages introduce cumulative, mechanical hysteresis and dither, and are also susceptible to wear. High and costly precision in the mechanical linkages is required to minimize error. This precision, in turn, must be maintained in the moving parts (gears) that are most susceptible to wear. If high accuracy and/or high reliability is required, this type of sensor is not practical.

The third type of sensor is a "linear displacement" sensor which is combined with a mechanical conversion linkage such as a worm drive to translate multiple turns into a linear displacement. As with the reduction gear system of the second sensor type, the mechanical linkages introduce cumulative hysteresis and dither, as well as adding susceptibility to wear. High and costly precision is also required in these linkages to minimize error. This precision also must be maintained in the moving parts (gears) that are most susceptible to wear. High accuracy and/or high reliability requirements make this type of sensor impractical as well.

The single-turn or displacement sensors of these three sensor types can be either analog or encoder devices, but in all three types multiple turns are not sensed directly.

DISCLOSURE OF THE INVENTION

This invention provides a position sensor for sensing the rotational position of an axle such as a steering wheel column. The sensor measures absolute rotation about a fixed axis over multiple turns and can be configured for analog or digital output. Output of the sensor is inherently stable against temperature variation and exhibits no loss of calibration after a loss of power. The sensor can directly sense rotational position from a reference position through multiple turns.

Sensing apparatus constructed in accordance with one embodiment of the invention senses a rotational position of a shaft. A sensor coil monitors shaft position based upon a signal induced in the sensor coil. A transmission is coupled to the shaft for rotation with the shaft and is attached to a spiral conductor so that a configuration of the spiral conductor changes as the shaft orientation changes. An alternating current signal is applied to the spiral conductor and an output signal from the sensor coil related to orientation of the shaft is monitored.

BEST MODE FOR PRACTICING THE INVENTION

Figure 1:
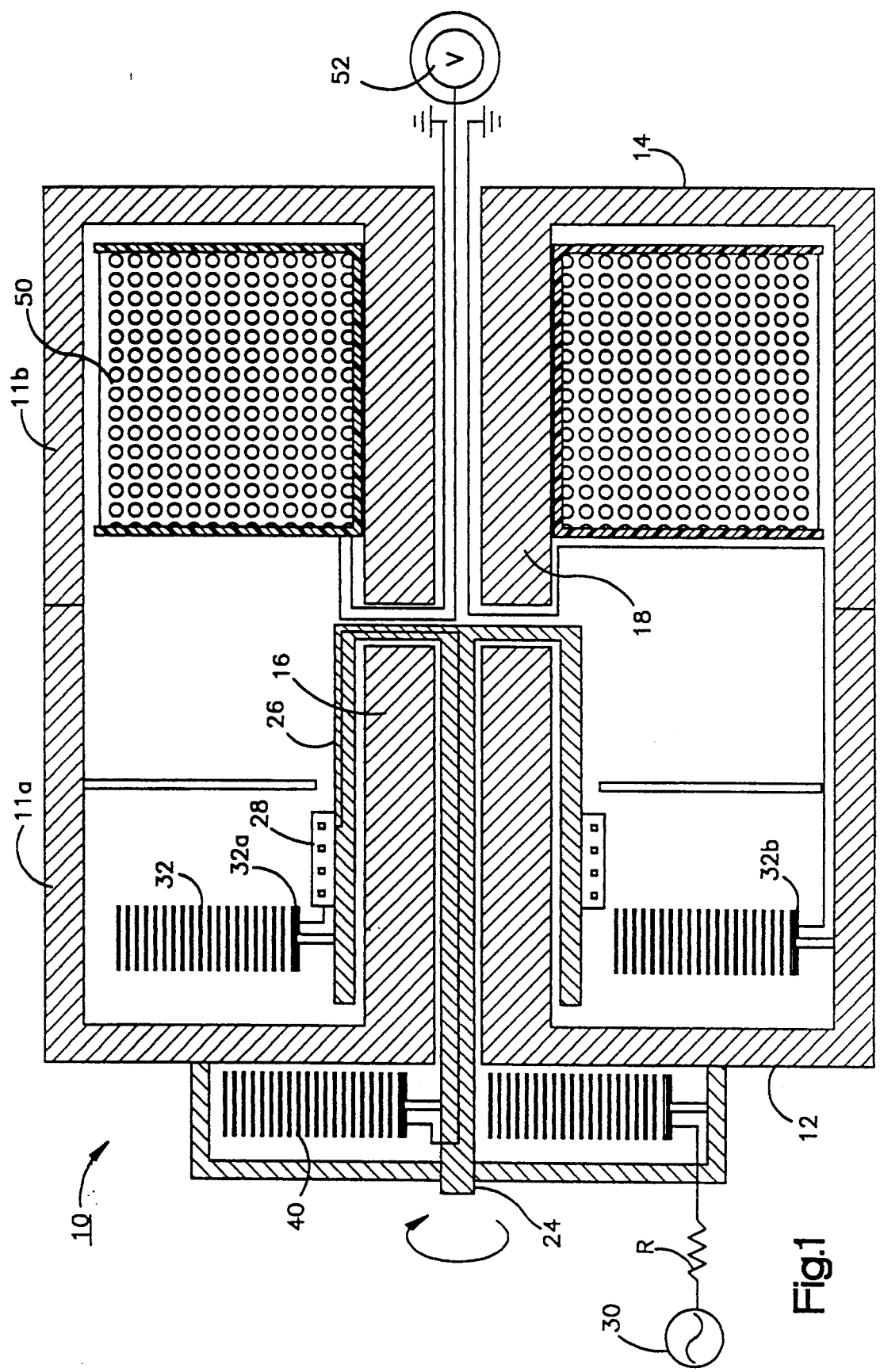
FIG. 1 is a section view of a rotational position sensor.

In a preferred embodiment of the invention, a rotational sensor 10 comprises a generally cylindrical housing that includes first and second ferrite housing segments 11a, 11b. Extending axially inward from opposite ends 12, 14 of the housing portions 11a, 11b are two annular transformer cores 16, 18. A leftmost core 16 surrounds an axle 24. A transmission 26 is coupled to the axle 24 for rotation with the axle and is located around a portion of the core 16. A primary coil 28 is attached to the transmission structure and is connected to a signal source 30.

The sensor further comprises a variable primary coil 32 in the form of a flexible conductor that is wound in a sense opposite the primary coil 28. An inner end 32a of the flexible conductor is connected to the transmission 26 and an outer end 32b is connected to the housing segment 11a and is grounded.

A current limiting resistor R acts as an input terminal to the primary coil 28.

A strain relief coil 40 is electrically connected to the primary coil and has an inner end that is connected to the axle 24 and an outer end that is connected to the housing and is electrically connected to the current limiting resistor R.

A secondary coil 50 is wound about the core 18 and monitors a magnetic field induced by the flexible conductor 32. The secondary coil 50 produces an output signal in response to the magnetic field. The output signal is monitored in order to determine the rotational position of the axle.

The sensor is configured as a gapped transformer with a fixed secondary coil 50 and a variable turn primary coil 32 for inducing a signal in the secondary coil, as well as, the variable turn strain relief coil. The secondary and primary coils are situated within the magnetic circuit of the housing portions 11a, 11b.

The variable turn and strain relief coil are preferably made of a flexible and electrically conductive material assembled in "clock spring" configurations. Rotation is sensed by providing a time-varying electrical excitation to the variable coil 32 while "winding" or unwinding it and thereby changing its effective number of turns. As the number of turns of the variable transformer coil 32 varies, the transformer coupling between the primary and secondary coils, along with the electromagnetic field induced in the secondary coil, is altered. The electromagnetic field in the secondary coil is readily measured by a high-input impedance voltage sensor 52 connected to the secondary coil's leads. By placing the strain relief coil 40 in an electrical series connection, the use of a "flying lead" or wiping contact with the winding end of the variable transformer is eliminated.

A time-varying signal ($V_{PRIM}$) which nominally is 3 $V_{pp}$ and 12.8 KHz is input to the current limiting resistor R from the source 30 with return on the lead of the outer end of the variable transformer. The current limiting resistor R is selected to have greater than 100 times the impedance of the variable transformer in the unwound position. This results in an approximately constant drive for the sensor. An induced emf ($V_{SEC}$) can then be observed at the secondary coil where:

$$|V_{SEC}|(\text{Peak to Peak}) = \frac{WI_P \cdot N_P \cdot N_S}{R}$$

with $w=2\Pi*$ "primary frequency," $I_p=$ "primary peak," $N_p=$ "total primary turns," $N_s=$ "total secondary turns," R is the "magnetic reluctance" of the magnetic circuit of the sensor. Ideally, the transformer gap is sufficiently large to contain greater than 99% of the reluctance R of the device and thereby minimize variation in R over temperature. The mechanical stability of the magnetic portions of the device (nothing magnetic moves) results in R being effectively constant during normal operation of tile device. Additionally, construction of the housing by using ferrite or a similar material for desired magnetic components, results in core losses being negligible during operation of the sensor. The input impedance of the primary is dominated by the current limiting resistor so that current in the primary is approximately the voltage of the source divided by the resistance of the current limiting resistor R.

As the axle 24 turns, it either winds or unwinds the flexible conductor 32 and the strain relief coil 40. Because the strain relief coil lies outside the magnetic circuit formed by the housing portions 11a, 11b and the transformer core, it can expected to have negligible effect on $V_{SEC}$ as it winds or unwinds. However, the flexible conductor, by being situated about the core, is in the magnetic circuit of the device. As tile flexible conductor 32 winds and unwinds, the effective number of primary turns ($N_p$) will increase or decrease resulting in a ratiometric change between $V_{SECPP}$ and the rotation of the axle. Note the $N_p$ is continuously varying as the axle turns and is not restricted to integer values. The peak to peak amplitude of $V_{SEC}$ ($V_{SECPP}$) is then directly proportional to the total number of primary turns ($N_p$). $V_{SECPP}$ is extracted from $V_{SEC}$ by amplitude demodulation. Demodulation can be achieved by full-wave rectification of $V_{SEC}$ followed by low-pass filtering among other methods available to those skilled in the art of electronics.

Figure 2:
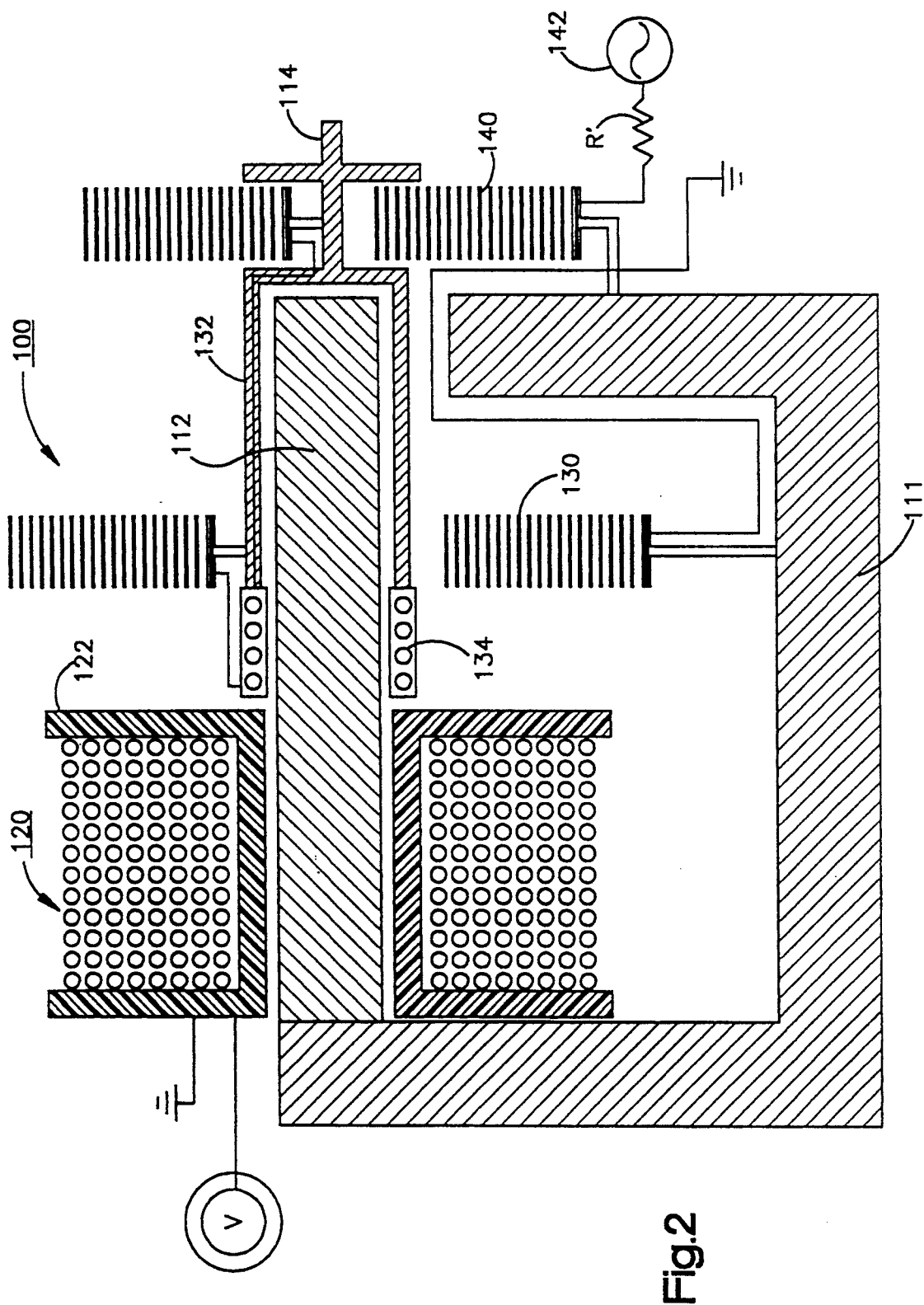
FIG. 2 is a section view of an alternate embodiment of a rotational position sensor.

An alternative embodiment of the sensor 110 is depicted in FIG. 2 and comprises a square frame 111 having a cylindrical support 112 co-axial with a shaft 114. The transformer core and the magnetic circuit of the transformer of the preferred embodiment remain substantially unchanged during normal operation of the sensor embodying the alternate embodiment. A secondary coil 120 containing a large number of turns is wound on a bobbin 122. The bobbin 122 is fixed to and situated about the cylindrical support of the square frame and remains stationary. The secondary coil has leads that are brought out of the bobbin and act as terminals where an output signal is monitored. A flexible conductor 130 is arranged in a "clock spring" configuration and is situated about the cylindrical support of the square frame. The flexible conductor has an inner end that is mechanically tied to a transmission 132 that rotates about the cylindrical support 112 and an outer end that is mechanically tied to the square frame 111.

The alternate embodiment further comprises a fixed primary coil that is mechanically connected to and rotates with the transmission 132. The fixed primary coil 134 is electrically connected in series to the flexible conductor 130. The fixed primary coil 134 is also connected to a strain relief coil 140 in series.

The strain relief coil is situated about the axle and is configured in a "clock spring" arrangement. The inner end of the strain relief coil is mechanically connected to and rotates with the axle while the outer end is connected to the square frame. The strain relief coil is electrically grounded. A current limiting resistor R' is electrically connected in series with the strain relief coil 140 and serves as the input terminal for a time-varying drive signal from a signal source 142.

In the alternative embodiment, the time-varying signal ($V_{PRIM}$), which nominally is 3 $V_{pp}$ and 12.8 KHz is input to the current limiting resistor R' with return on the grounding connection. The current limiting resistor R' is selected to have greater than 100 times the impedance of the flexible conductor 130 in its "unwound" position. This results in an approximately constant current drive for the device. An electromagnetic field ($V_{SEC}$) is induced in the secondary coil 120. Ideally, the transformer gap is sufficiently large to contain greater than 99% of the reluctance of the sensor and thereby minimize variation in reluctance with temperature. The mechanical stability of the magnetic portions of the device (nothing magnetic moves) results in the reluctance being effectively constant during normal operation of the device. Additionally, the use of material such as ferrite or similar material for its magnetic components results in core losses being negligible during operation of the sensor. The input impedance of the primary coil is dominated by the current limiting resistor.

As the axle 114 turns, it either winds or unwinds the flexible conductor 130 and the strain relief coil 140. Because the strain relief coil 140 lies outside the magnetic circuit formed by the square frame, it can be expected to have negligible effect on $V_{SEC}$ as it winds or unwinds. However, the flexible conductor 130, by being situated about a cylindrical extension of the square frame, is in the magnetic circuit of the device. As the flexible conductor winds and unwinds, the effective number of primary turns ($N_p$) will either increase or decrease resulting in a ratiometric change between $V_{SECPP}$ and the rotation of the axle. The peak to peak amplitude of $V_{SEC}$ ($V_{SECPP}$) is then directly proportionally to the total number of primary turns ($N_p$). Note, $N_p$ is continuously varying as the axle turns and is not restricted to integers values. $V_{SECPP}$ is extracted from $V_{SEC}$ by amplitude demodulation. Demodulation can be achieved by full-wave rectification of $V_{SEC}$ followed by low-pass filtering among other methods available to those skilled in the art of electronics.

In its broader aspects then, the invention provides a sensing apparatus for sensing an orientation of an axle. The sensing apparatus comprises sensing structure including a sensor coil for monitoring axle orientation based upon a signal induced in the sensor coil. The sensing apparatus further comprises the transmission structure coupled to the axle for rotation with the axle. A spiral (clockspring) conductor is included having an inner end attached to the transmission structure to cause a configuration of the spiral conductor to change as the axle orientation changes. Connectors are included for fixing an outer end of the spiral conductor. Electrical conductors are connected to the outer end for maintaining the outer end of the spiral conductor at a fixed electric potential. A power supply for applying an alternating current signal to the spiral conductor energizes the sensor and an output monitor is connected to the sensor coil for monitoring signals induced in the sensor coil and correlating the induced signal with the orientation of the axle.

Alternate Embodiment

Figure 3:
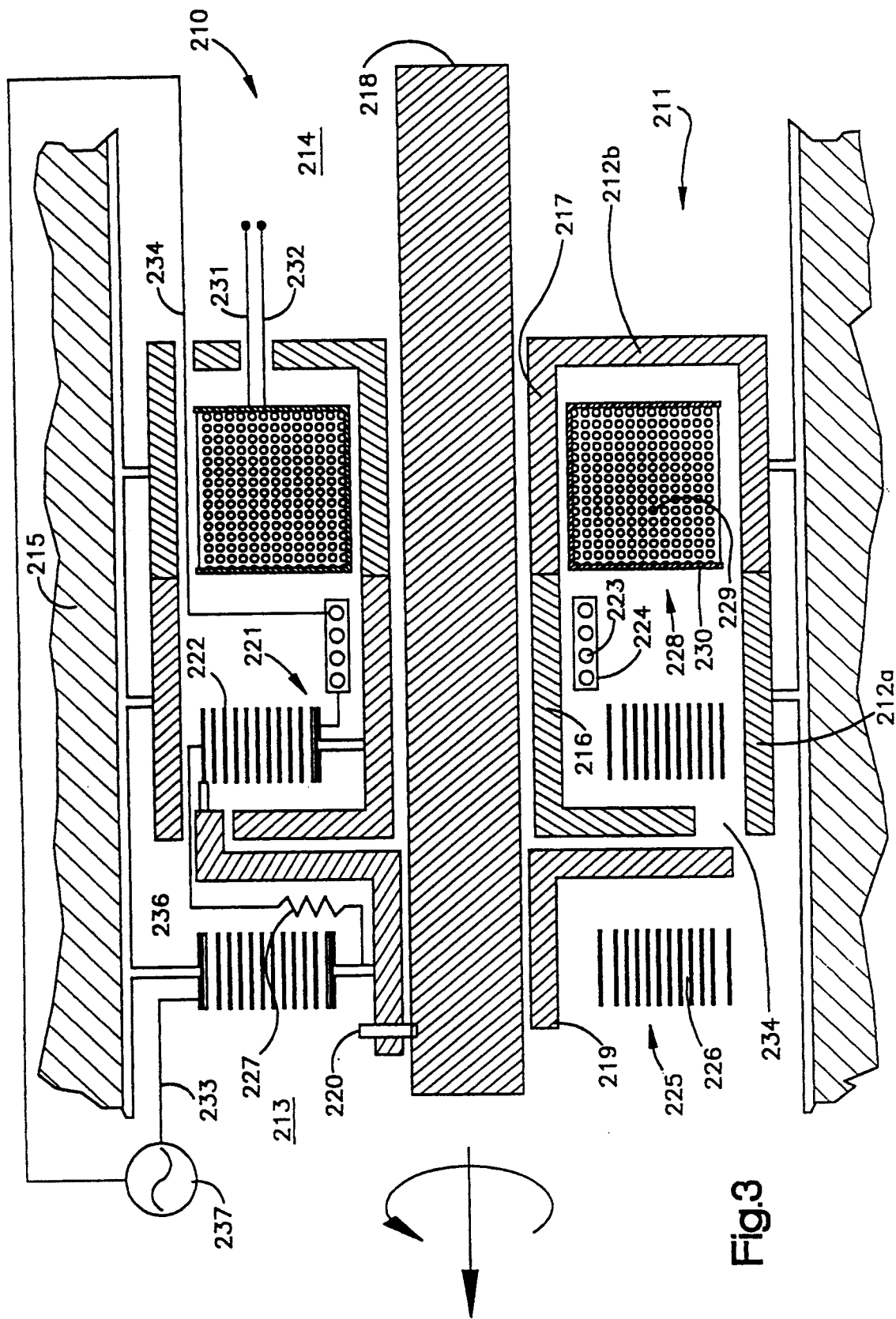
FIG. 3 is a section view of a third embodiment of a rotational position sensor.

Referring to FIG. 3, a third embodiment of the sensor 210 comprises a generally cylindrical first housing 211 that is non-rotating and includes 1st and 2nd transformer housing segments 212a, 212b which are mounted to a non-rotating member 215. Extending axially inward from opposite ends 213, 214 of the housing portions 212a, 212b are two annular transformer cores 216, 217 that surround but do not contact an axle 218. The transformer cores ideally are composed of ferrite but could also be constructed of other suitable transformer material. A second rotating housing 219 is situated colinearly and coaxially with respect to the first housing 211. The second housing 219 surrounds and rotates with the axle 218. Housing 219 is fixed to axle 218 by pin 220.

The sensor further comprises a two-part primary coil 221 in the form of a first loosely wound flexible conductor 222 and a fixed, tightly wound conductor 223 on bobbin 224. Conductors 222, 223 are wound with approximately the same number of turns in the opposite sense of each other. They are then placed over transformer core 216 as shown and are electrically connected in series. A strain relief coil 225 comprised of a loosely wound flexible conductor 226 is situated on the rotating housing part 219. The strain relief coil conductor 226 and the primary coil conductor 222 are electrically connected in series through a resistor 227. A secondary coil 228 comprised of a tightly wound conductor 229 on bobbin 230 is situated about core 217. The two leads 231, 232 of conductor 229 are brought out of the transformer core 217 and housing part 212b. A lead 233 of flexible conductor 226 extends from the non-rotating end of 226 which is fixed to the external non-rotating member 215. An additional lead 234 extends from conductor 223 and is brought out of the transformer core 217 and housing part 212b as shown.

The sensor 210 is configured as a gapped voltage transformer with a fixed secondary 228 and a variable primary 221 for inducing a signal in the secondary. The coils 221 and 228 are situated in and are magnetically linked by the transformer cores 216, 217. The strain relief coil 225 is situated without the transformer cores 216, 217 and substantially has no direct transformer coupling to the secondary coil 228. Axle rotation is sensed through the "winding" or "unwinding" of the loosely wound, flexible primary conductor 222 via linkage 236 in conjunction with a time-varying electrical excitation 237 applied to coil 221. The "winding" or "unwinding" action changes the number of turns about the transformer core of conductor 222 which, in turn, changes the relative balance of turns between the coils formed by conductors 222, 223. This results in a net change in the number of turns in primary coil 221 and directly alters the signal induced in the secondary coil 228. In this third embodiment, the time-varying excitation 237 is nominally a 3 $V_{pp}$ and 12.8 KHz a.c. signal applied across leads 233, 234. The resistance R' of the current limiting resistor 227 is selected to have greater than 100 times the impedance of the primary coil 221 in the nominal "unwound" axle position. This results in an approximately constant current drive for the device. When the primary conductors 222, 223 are unbalanced so that there are more turns on one conductor than on the other, an EMF ($V_{SEC}$) is induced in the secondary coil 228. Ideally the transformer gap 235 is sufficiently large to contain greater than 99% of the reluctance of the sensor and thereby minimize variation in reluctance with temperature. The mechanical stability of the magnetic portions of the device (no magnetic part of the transformer moves) results in the reluctance being substantially constant during normal operation of the device. Additionally, the use of material such as ferrite for its magnetic components reduces core losses during operation of the sensor.

AS the axle 217 turns, it either winds or unwinds flexible conductor 222 and the strain relief conductor 226. The winding and unwinding of conductor 226 has virtually no effect on the EMF induced in the secondary coil 228 as conductor 226 is situated outside the transformer cores 216, 217. However, as conductor 222 winds or unwinds, the net number of primary turns $N_p$ changes and results i a ratiometric change in the EMF ($V_{SEC}$) induced on the secondary coil 228. The peak-to-peak amplitude of $V_{SEC}$ ($V_{SECPP}$) is then directly proportional to net number of primary turns $N_p$. Note, $N_p$ is continuously varying as the axle turns and is not restricted to integer values. Note also that the shape of the cores 216, 217 effectively shields the primary 221 and secondary 228 coils from effects associated with magnetic properties of the axle 218. Demodulation of $V_{SEC}$ to measure $V_{SEC}$ is readily achieved by full-wave rectification followed by low pass filtering among other methods available to one skilled in the art of electronics.

The present invention has been described with a degree of particularity. It is the intent, however, that the invention include modification from the disclosed design falling within the spirit or scope of the appended claims.

We claim:

1. An inductive sensing apparatus for sensing a rotational position of a shaft comprising:
   a) an elongated transformer core means;
   b) a sensor coil wound about a first segment of the transformer core means;
   c) transmission means coupled to the shaft for rotation with the shaft, the transmission means surrounding a second segment of the transformer core means, the first and second segments of the transformer core means being spaced apart along the transformer core means;
   d) a spiral conductor including an inner and outer end and having a configuration including a plurality of turns, the inner end of the conductor electrically coupled to the transmission means, the outer end of the conductor held in a stationary position so that as the shaft rotates back and forth about an axis of rotation the spiral conductor is wound more or less tightly thereby changing the configuration of the spiral conductor;

e) electrical conduction means connected to said outer end of the spiral conductor for maintaining the outer end of said spiral conductor at a fixed electrical potential;

f) means for applying an alternating current voltage to said spiral conductor thereby magnetically inducing a voltage in the sensor coil, the voltage induced in the sensor coil being dependent upon the configuration of the spiral conductor; and g) output means connected to said sensor coil for monitoring induced voltage in the sensor coil and correlating said induced voltage with the rotational position of the shaft.

2. The sensing apparatus of claim 1 wherein the sensing apparatus comprises a housing defining an interior and including first and second housing portions, the housing portions including interior projections defining the elongated transformer core means, the transformer core means being co-axial with said shaft and the outer end of the spiral conductor fixedly attached to the housing.

3. The sensing apparatus of claim 2 further comprising a dry lubricating material between said transformer core means and said transmission means to allow said transmission means to rotate freely with respect to said transformer core means.

4. The sensing apparatus of claim 2 wherein the transformer core means is comprised of two spaced apart transformer cores, the first housing portion interior projection defining the first transformer core and the second housing portion interior projection defining the second transformer core, the transmission means surrounding at least a portion of the first transformer core and the sensor coil is wound around a portion of the second transformer core 5. A multi-turn position sensor for sensing the rotational position of a shaft comprising:
   a) a housing defining an interior into which the shaft extends;
   b) a secondary coil wound about an axis and fixed within the housing and electrically connected to a sensor circuit;
   c) a capstan coupled to the shaft;
   d) a primary coil attached to said capstan and having connection means for connecting said primary coil to an alternating current signal;
   e) a spirally wound conductor series coupled to the primary coil and wound in a direction such that electrically energizing the spirally wound conductor and the primary coil results in magnetic fields emanating from the spirally wound conductor and the primary coil to induce a signal in the sensor coil;
   f) connection means for connecting an outer end of the spirally wound conductor to said housing such that as the shaft is rotated back and forth about an axis of rotation the spirally wound conductor is wound more or less tightly thereby changing the signal induced in the sensor coil;
   g) electrical conduction means connected to said outer end of the spirally wound conductor for grounding said spirally wound conductor;
   h) connection means for connecting an inner end of the spirally wound conductor to said capstan;
   i) electrical conduction means for energizing the primary coil;
   j) a current limiting resistor connected in series with said primary coil; and
   k) a strain relief coil electrically connected to said primary coil having an inner end and an outer end, said inner end being connected to said shaft and said outer end being connected to said housing and electrically connected to said current limiting resistor.

6. The sensor of claim 5 wherein said housing comprises first and second halves, each of said halves includes an interior projection defining a core, the primary coil being wound around one core and secondary coil being wound around the other core.

7. The sensor of claim 5 further comprising a dry lubricating material placed between said core and said capstan to allow said capstan to rotate freely.

8. Sensing apparatus for sensing an orientation of a shaft comprising:
   a) sensing means including a sensor coil for monitoring shaft orientation based upon a voltage induced in the sensor coil;
   b) transmission means coupled to the shaft for rotation with the shaft;
   c) a spiral conductor including an inner and an outer end and having a configuration including plurality of turns, said inner end of the spiral conductor electrically connected to the transmission means and the outer end of the conductor held stationary such that as the shaft rotates back and forth about an axis of rotation the spiral conductor is wound more or less tightly thereby changing the configuration of the spiral conductor;
   d) a primary coil coupled to the transmission means and wound in a direction such that electrically energizing the primary coil and the spiral conductor results in magnetic fields emanating from the primary coil and the spiral conductor to induce a voltage in the sensor coil, the voltage induced being dependent on the configuration of the spiral conductor
   e) electrical conduction means connected to said outer end of the spiral conductor for maintaining the outer end of said spiral coil at a fixed electric potential;
   f) means for applying an alternating current voltage to said spiral conductor; and
   g) output means connected to said sensor coil for monitoring the voltage induced in the sensor coil and correlating said induced voltage with the orientation of the shaft.

9. The sensing apparatus of claim 8 wherein the sensing apparatus comprises a housing defining an interior and having first and second housing portions, each of the housing portions including interior projection defining a transformer core portion, the transmission means surrounding at least a portion of one of the transformer cores and the sensor coil being wrapped about the other of the transformer cores.

10. The sensing apparatus of claim 9 further comprising a dry lubricating material between the transmission means and the transformer core portion surrounded by the transmission means to allow said transmission means to rotate freely about said transformer core portion.

* * * * *